Patented Oct. 26, 1926.

1,604,310

UNITED STATES PATENT OFFICE.

HENRY L. PRESTHOLDT, OF MINNEAPOLIS, MINNESOTA.

CASEIN GLUE.

No Drawing. Application filed April 17, 1922. Serial No. 554,199.

My invention provides a new composition of matter herein designated as "casein glue", but which, from its broader aspect is an adhesive compound adapted to be used, by itself or commingled with other substances, as an adhesive coating.

In this improved adhesive composition, casein is used as the adhesive base, and in the preferred formula is commingled with calcium chloride, calcium tannate and sodium fluoride.

I have obtained a very highly efficient glue or adhesive by the use of the above noted substances in accordance with the following formula:

| | Parts. |
|---|---|
| Casein | 50 to 75 |
| Calcium hydroxide | 10 to 30 |
| Calcium chloride | 4 to 10 |
| Calcium tannate | 2 to 8 |
| Sodium fluoride | 2 to 8 |
| Tri-sodium phosphate | 3 to 15 |
| Castor oil | 1 to 4 |

The above noted substances, except the oil, are commingled in dry or powder form and the oil is in such small quantity that it does not make the powdered mass pasty, but, nevertheless, it is one of its functions to keep the composition from getting into dust form. When the composition is to be used, it will be introduced into water to form an emulsion, and it is then, of course, that the chemical reactions that develop the adhesive qualities of the composition, will take place. After these reactions have taken place, the emulsion is adapted to be used as a glue or as a coating, or to be commingled with other substances such as paint or calcimine which contain certain color pigments. When desired, however, the color-producing pigments may be commingled with the dry composition. When the composition is to be used as a glue, no additions to the formula, except water, will be required.

The colloidal properties of the casein are brought into solution through the action of calcium hydroxide, calcium chloride, sodium fluoride, and tri-sodium phosphate, in contact with water. Calcium tannate imparts the peculiarity of delaying the setting up process of the glue when applied to the surface of wood and, being of a vegetable nature, reduces the likelihood of staining the wood. Calcium hydroxide in combination with casein produces the well known caseinates of lime, which are insoluble, thereby producing a waterproof glue. Calcium chloride adds to the liquid life of the glue. Tri-sodium phosphate retards the formation of ammonia and, in conjunction with sodium fluoride, acts as a solvent for casein. The castor oil can be omitted from the composition without changing the general character of the same.

What I claim is:

1. An adhesive composition made substantially in accordance with the following formula, to wit:

| | Parts. |
|---|---|
| Casein | 50 to 75 |
| Calcium hydroxide | 10 to 30 |
| Calcium tannate | 2 to 8 |
| Sodium fluoride | 2 to 8 |
| Phosphate of soda | 3 to 15 |
| Chloride of calcium | 4 to 10 |

2. An adhesive composition made in accordance with the following formula:

| | Parts. |
|---|---|
| Casein | 50 to 75 |
| Calcium hydroxide | 10 to 30 |
| Calcium chloride | 4 to 10 |
| Calcium tannate | 2 to 8 |
| Sodium fluoride | 2 to 8 |
| Tri-sodium phosphate | 3 to 15 |
| Castor oil | 1 to 4 |

In testimony whereof I affix my signature.

HENRY L. PRESTHOLDT.